(12) United States Patent
Fornage

(10) Patent No.: US 7,222,806 B2
(45) Date of Patent: May 29, 2007

(54) CONDIMENT MILL

(75) Inventor: Jean-Claude Fornage, Besancon (FR)

(73) Assignee: PSP Industries SAS, Quingey (FR)

( * ) Notice: Subject to any disclaimer, the term of this patent is extended or adjusted under 35 U.S.C. 154(b) by 0 days.

(21) Appl. No.: 10/544,825

(22) PCT Filed: Nov. 7, 2003

(86) PCT No.: PCT/FR03/03328

§ 371 (c)(1),
(2), (4) Date: Aug. 5, 2005

(87) PCT Pub. No.: WO2004/091355

PCT Pub. Date: Oct. 28, 2004

(65) Prior Publication Data

US 2006/0071105 A1   Apr. 6, 2006

(30) Foreign Application Priority Data

Mar. 17, 2003   (FR) ................... 03 03215

(51) Int. Cl.
*A47J 17/00*   (2006.01)
*A47J 42/00*   (2006.01)
(52) U.S. Cl. ................... 241/168; 241/169.1
(58) Field of Classification Search ........ 241/168, 241/169.1
See application file for complete search history.

(56) References Cited

U.S. PATENT DOCUMENTS

| | | |
|---|---|---|
| 1,327,385 A | 1/1920 | Hammer |
| 4,685,627 A | 8/1987 | Lee |
| 4,993,584 A * | 2/1991 | Macario ............ 220/523 |
| 5,651,506 A | 7/1997 | Hockey |
| 5,785,264 A * | 7/1998 | Yang ............ 241/169.1 |
| 2002/0117566 A1 | 8/2002 | Cheng |
| 2002/0145065 A1 | 10/2002 | McCowin |

FOREIGN PATENT DOCUMENTS

| | | |
|---|---|---|
| BE | 469899 | 6/1947 |
| CH | 351726 | 1/1961 |
| DE | 2922656 | 12/1980 |
| DE | 8531554 | 12/1985 |
| DE | 3632688 | 2/1993 |
| DE | 19 514794 | 10/1996 |
| DE | 20 000353 | 5/2000 |
| EP | 0281714 | 9/1988 |

(Continued)

*Primary Examiner*—Faye Francis
(74) *Attorney, Agent, or Firm*—Gary M. Cohen

(57) ABSTRACT

A condiment mill for products such as dry garlic or citrus fruit peels includes a conventional container (2) for containing the condiment, a grinding mechanism (3) fixed to the bottom of the container (2), and a rotatable knob (4) which is arranged on the top part of the container (2) and which is mechanically connected to the grinding mechanism by a rotating drive shaft (5). The mill (1) is also provided with a cutting blade (6) which is arranged above the grinder (3) and which is fixed to the drive shaft (5). The mill is further provided with a separator for dividing the container into at least two adjacent compartments which conform to the size of the condiment in such a way that the condiment is maintained in a substantially vertical position, for slicing of the condiment by the cutting blade (6).

13 Claims, 2 Drawing Sheets

FOREIGN PATENT DOCUMENTS

| | | |
|---|---|---|
| FR | 2159828 | 6/1973 |
| FR | 2857841 | 1/2005 |
| FR | 2857842 | 1/2005 |
| FR | 2865368 | 7/2005 |
| FR | 2873559 | 2/2006 |
| GB | 1429310 | 3/1976 |
| WO | WO 0028870 | 5/2000 |

\* cited by examiner

CONDIMENT MILL

BACKGROUND OF THE INVENTION

The present invention relates to a condiment mill, and more particularly, to a condiment mill including a conventional container in which condiments are housed in the form of grains, and a grinding mechanism attached to the bottom of the container which is capable of being rotated by a user to grind the grains housed in the container in order to obtain a powder for sprinkling over food.

Such mills cannot be used to provide a sufficient milling of larger condiments such as pimentos, citrus fruit peels, dried garlic cloves, etc. Specifically, when such condiments are inserted into the mill, the mill is difficult to operate due mainly to the soft texture of the condiments, and the powder obtained is not homogenous.

The object of the present invention is to provide a condiment mill that can overcome some or all of the aforementioned disadvantages.

SUMMARY OF THE INVENTION

In accordance with the present invention, a condiment mill is provided which is capable of grinding condiments such as dried garlic or citrus fruit peels. The mill conventionally includes a container for receiving the condiments, a grinding mechanism attached to the bottom of the container, a rotary knob which is placed on the top portion of the container and which is connected to the grinding mechanism by a shaft (hereafter, referred to as a drive shaft), in order to rotate the grinding mechanism, and a cutting blade which is provided above the grinder and which is attached to the drive shaft. The mill is further provided with a means for separating the container into at least two compartments, arranged inside the container. The separation means is shaped according to the size of the condiments in order to hold the condiments in a substantially vertical position, for slicing of the condiments with the cutting blade.

Preferred embodiments of the present invention include the following features. The separation means includes a ring provided with means for rotary immobilization, which is intended to be housed in the top portion of the container, and a tube which is placed coaxially inside the ring and which is connected to the ring by at least two vertical walls protruding from the tube to the periphery of the ring. The means for rotary immobilization of the ring includes at least one lug protruding from the outer periphery of the ring, which is intended to interact with a notch made on the body of the container. The container has, in vertical cross-section, a frustoconical shape which defines an imaginary "V", and the top of the imaginary "V" of the truncated cone is situated in the vicinity of the bearing face of the mill.

These and other features of the present invention are further discussed in the detailed description of preferred embodiments provided hereafter, with reference to the following drawings.

DETAILED DESCRIPTION OF PREFERRED EMBODIMENTS

Figure 1:
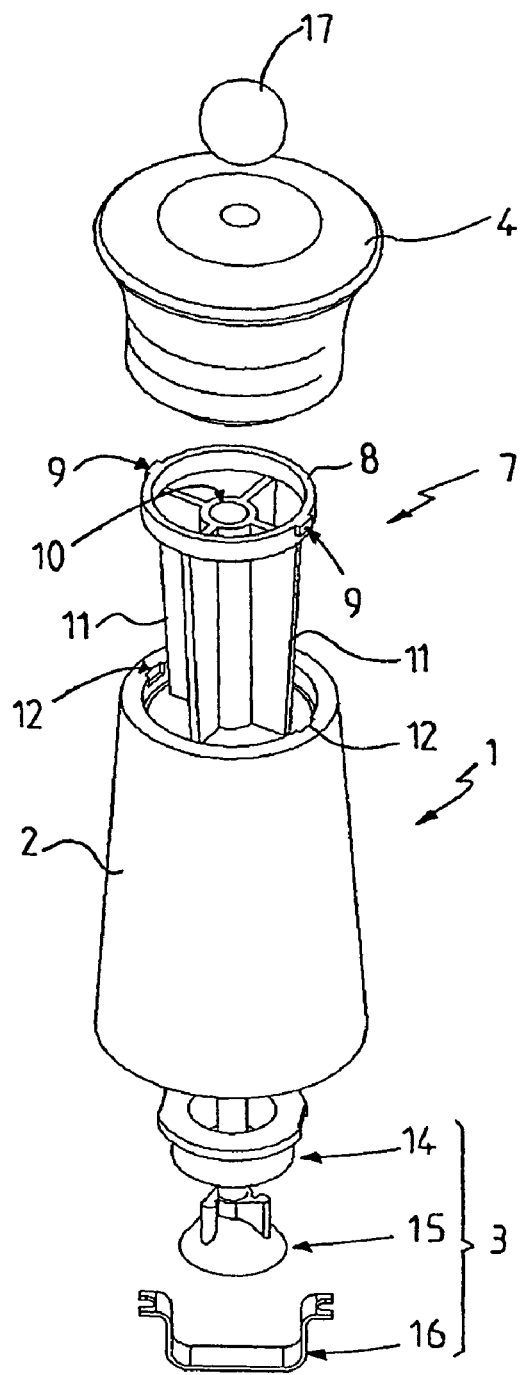
FIG. 1 is an exploded perspective view of a condiment mill produced in accordance with the present invention.
Figure 2:
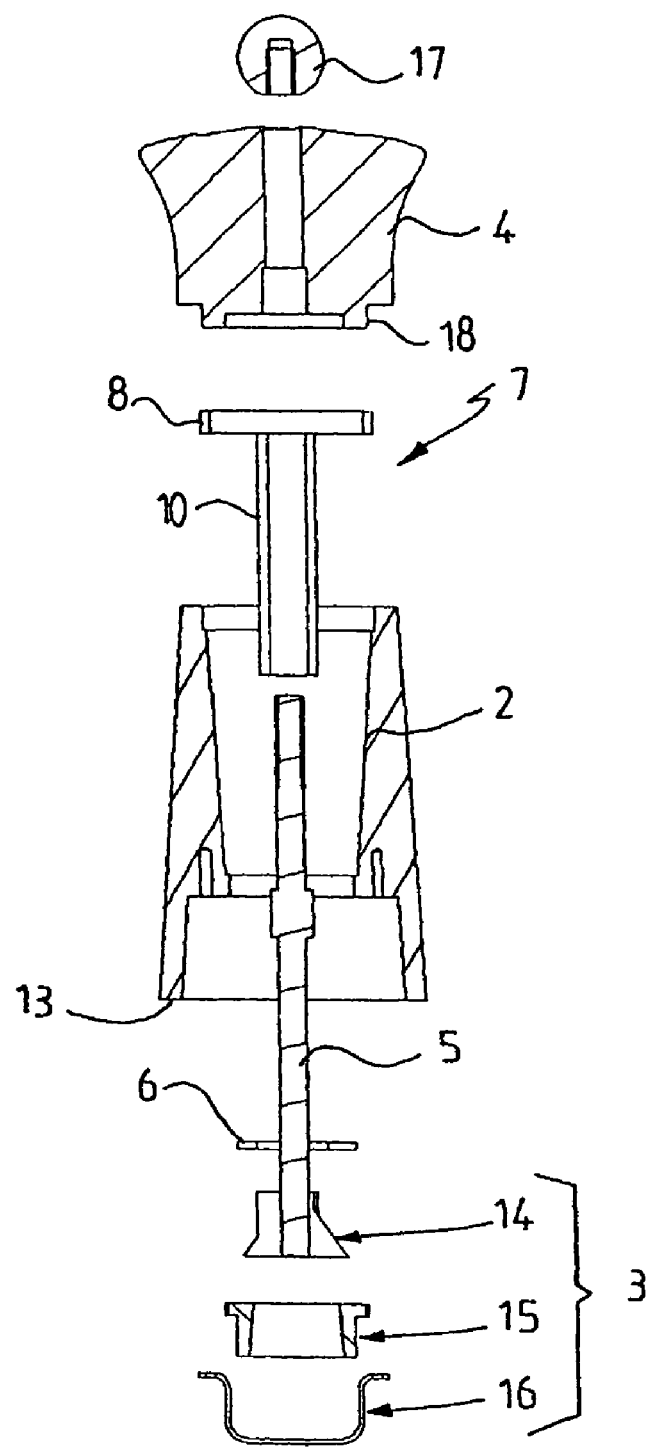
FIG. 2 is an exploded cross-sectional view of the mill shown in FIG. 1.

FIGS. 1 and 2 show a mill 1 for grinding condiments such as dried garlic or citrus fruit peels, etc. The mill 1 conventionally includes a container 2 for containing the condiments, a grinding mechanism 3 attached to the bottom of the container 2, and a rotary knob 4 which is placed on the top portion of the container 2 and which is connected to the grinding mechanism 3 by a shaft 5, which will hereafter be called a drive shaft, in order to rotate the grinding mechanism. Advantageously, the mill 1 is provided with a cutting blade 6 attached to the drive shaft 5, above the grinder 3, to permit the condiments to be reduced to fine particles before they are ground.

In accordance with the present invention, the mill 1 is furnished with a means 7 arranged inside the container 2 for separating the container into at least two compartments. The separation means 7 is shaped according to the size of the condiments in order to hold the condiments in a substantially vertical position, for slicing of the condiments with the cutting blade 6.

In a preferred, nonlimiting embodiment, the separation means 7 includes a ring 8 provided with means 9 for rotary immobilization of the ring 8, which is intended to be housed in the top portion of the container 2, and a tube 10 which is placed coaxially inside the ring 8 and which is connected to the ring 8 by at least two vertical walls 11 protruding from the tube 10 to the periphery of the ring 8.

The means for rotary immobilization of the ring 8 includes at least one lug 9 protruding from the outer periphery of the ring 8, for interacting with a notch 12 made on the body of the container 2. In the embodiment shown, the ring 8 is furnished with two lugs 9 for interacting with two notches 12 made in the top portion of the body of the container 2 when in an assembled position.

It should be noted that the container 2 advantageously has, in vertical section, a frustoconical shape which forms an imaginary "V". The top of the imaginary "V" of the truncated cone is situated in the vicinity of the bearing face 13 of the mill 1, as can be seen in FIG. 2. Such a shape for the container 2 makes it possible to limit the clearance between the condiments so that the condiments can be held in a vertical position before being reduced to small pieces by the cutting blade 6 and then ground.

The grinding mechanism 3 housed in the bottom portion of the container 2 conventionally includes the drive shaft 5, one end of which is connected to a grinding wheel 14 (also called a ball) that interacts with a grinding ring 15 which is positioned above the grinding wheel 14 and which is attached in a cavity (not visible) made in the container 2. A clamp 16 is attached to the bottom portion of the container 2, by screws, in order to secure the grinding mechanism 3 to the container 2. The top end of the shaft 5 is furnished with threads for attaching the knob 4 onto the shaft 5 by a nut 17. The nut 17 also adjusts the fineness of the grind.

It should be noted that the knob 4 is advantageously provided with a peripheral collar 18, which protrudes downwardly. Upon assembly of the mill, the peripheral collar 18 makes it possible to center the body of the knob 4 inside the ring 8 of the separation means 7. The knob 4 also closes the container 2, and consequently makes it possible to fill the container 2 by simply removing the knob 4, without removing the separation means 7.

Operation of the condiment mill will now be described with reference to FIGS. 1 to 3.

Figure 3:
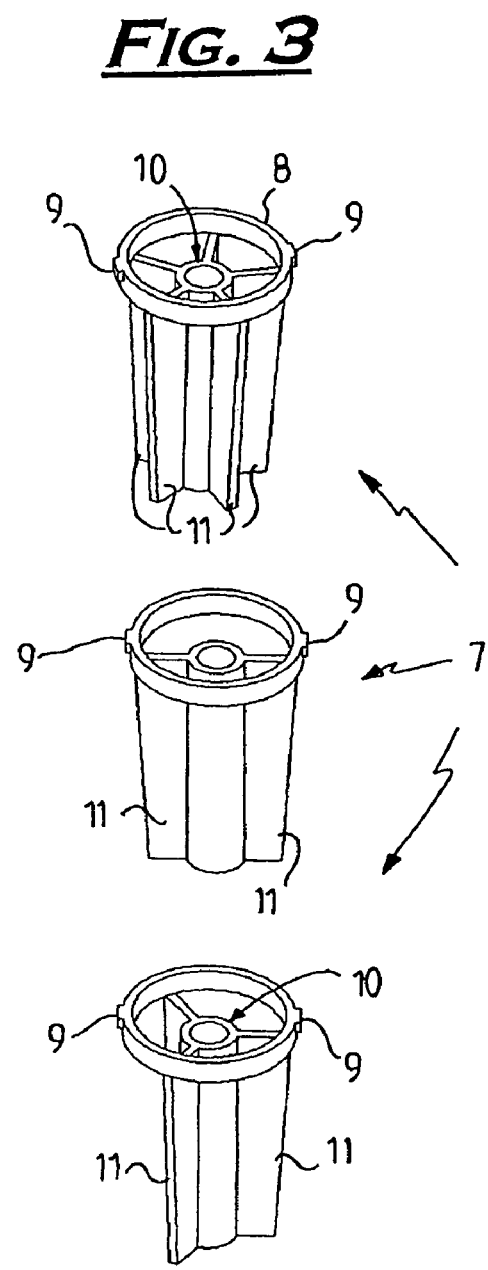
FIG. 3 is an exploded perspective view showing various separators.

Depending on the type of condiments, and accordingly, their size, the user arranges the appropriate separation means 7 inside the mill (as can be seen in FIG. 3). For example, the separation means 7 can be provided with two, three, four or five compartments. To do this, the user unscrews the nut 17, in order to release the knob 4, and slots the tube 10 of the selected separation means 7 onto the drive shaft 5 while positioning the lugs 9 of the ring 8 in the notches 12 on the body of the container 2. The user may then place the condiments in a substantially vertical position in each compartment before replacing the knob 4 and retightening the nut 17 on the drive shaft 5.

The mill is then ready to be used to grind the condiments into a fine powder. It should be understood that, with each rotation of the knob 4 rotatably connected to the drive shaft 5, the condiments will first be subjected to the action of the cutting blade 6, for reducing the condiments to pieces before discharging them toward the grinder. During this cutting phase, it will be noted that the walls of the separation means 7 hold the condiments in order to prevent them from lying down and avoiding the blade. The cutting blade 6 can have three, four or five sharp edges, and each sharp edge can be provided with a bevel to push the condiments toward the grinder.

It will be understood from the above description that the condiment mill of the present invention is relatively simple to produce and can be used to grind "soft" textured products without adversely affecting the correct operation of the mill. It will also be understood that although the present invention has been described with reference to one particular embodiment, the present invention further includes all technical equivalents of the means described.

The invention claimed is:

1. A condiment mill for grinding a condiment, including dried garlic condiments and citrus fruit peel condiments, comprising:
   a container for containing the condiment;
   a grinder attached to bottom portions of the container;
   a rotary knob placed on top portions of the container and connected to the grinder by a drive shaft, for rotating the grinder;
   a cutting blade attached to the drive shaft, at a location above the grinder; and
   a separator removably received inside the container and defining at least two compartments in the container, wherein the separator is shaped responsive to dimensions of the condiment for maintaining the condiment in a substantially vertical orientation, for slicing of the condiment with the cutting blade.

2. The condiment mill of claim 1 wherein the separator is operatively connected to the container so that the separator is prevented from rotating relative to the container.

3. The condiment mill of claim 2 wherein the separator and the container include at least one lug extending into a mating notch.

4. The condiment mill of claim 2 wherein the separator includes a ring received in the top portions of the container, a tube located coaxially inside the ring, and at least two vertical walls extending from the tube to peripheral portions of the ring.

5. The condiment mill of claim 4 wherein the ring and the container include at least one lug extending into a mating recess.

6. The condiment mill of claim 5 wherein the ring includes said at least one lug, and wherein said at least one lug protrudes from outer peripheral portions of the ring, for interacting with at least one notch on the body of the container.

7. The condiment mill of claim 1 wherein a vertical cross-section of the container is frustoconical and defines a truncated V-shaped form, and wherein top portions of the V-shaped form are situated adjacent to a bearing face associated with the grinder.

8. A condiment mill for grinding a condiment, including dried garlic condiments and citrus fruit peel condiments, comprising:
   a container for containing the condiment;
   a grinder attached to bottom portions of the container;
   a rotary knob placed on top portions of the container and connected to the grinder by a drive shaft, for rotating the grinder;
   a cutting blade attached to the drive shaft, at a location above the grinder; and
   a separator slidingly received inside the container, wherein the separator defines at least two compartments for receiving the condiment which are shaped responsive to dimensions of the condiment, for maintaining the condiment in a substantially vertical orientation for slicing of the condiment with the cutting blade, and wherein the separator is operatively connected to the container so that the separator is prevented from rotating relative to the container.

9. The condiment mill of claim 8 wherein the separator and the container include at least one lug extending into a mating notch.

10. The condiment mill of claim 8 wherein the separator includes a ring received in the top portions of the container, a tube located coaxially inside the ring, and at least two vertical walls extending from the tube to peripheral portions of the ring.

11. The condiment mill of claim 10 wherein the ring and the container include at least one lug extending into a mating recess.

12. The condiment mill of claim 11 wherein the ring includes said at least one lug, and wherein said at least one lug protrudes from outer peripheral portions of the ring, for interacting with at least one notch on the body of the container.

13. The condiment mill of claim 8 wherein a vertical cross-section of the container is frustoconical and defines a truncated V-shaped form, and wherein top portions of the V-shaped form are situated adjacent to a bearing face associated with the grinder.

* * * * *